United States Patent [19]

Shen et al.

[11] Patent Number: 5,282,016
[45] Date of Patent: Jan. 25, 1994

[54] OPTICAL ALIGNMENT BY USE OF ARRAYS OF REFLECTIVE OR DIFFRACTIVE OPTICAL ELEMENTS AND DETECTORS

[75] Inventors: Gon-Yen Shen, Brookfield; William Zmek, Naugatuck, both of Conn.

[73] Assignee: Hughes Aircraft Company, Los Angeles, Calif.

[21] Appl. No.: 921,887

[22] Filed: Jul. 29, 1992

[51] Int. Cl.[5] .................. G02B 27/62; G01B 11/27
[52] U.S. Cl. ............................. 356/400; 250/206.1; 250/208.6; 356/153
[58] Field of Search ............ 356/127, 399, 400, 153; 250/206.1, 208.6

[56] References Cited

U.S. PATENT DOCUMENTS

| | | | |
|---|---|---|---|
| 2,352,179 | 6/1944 | Bolsey | 356/399 |
| 2,577,807 | 12/1951 | Pryer | 356/153 |
| 4,070,117 | 1/1978 | Johannemeier et al. | 356/153 |
| 5,020,907 | 6/1991 | Ibe | 356/153 |
| 5,080,482 | 1/1992 | Berz et al. | 356/153 |
| 5,212,392 | 5/1993 | Berkcan et al. | 250/206.1 |

Primary Examiner—Peter Kratz
Attorney, Agent, or Firm—Michael W. Sales; Wanda K. Denson-Low

[57] ABSTRACT

A method and system of alignment of two mechanical members of a mechanical structure, particularly the primary and secondary mirrors (22, 24) of a telescope (20), is provided by a set of auxiliary optical elements (40) disposed on the primary mirror and a corresponding set of detectors (42) disposed on the secondary mirror. The array of detectors corresponds in configuration to the array of auxiliary optical elements so that there is correspondence between positions of auxiliary optical elements with positions of detectors about a common central axis (38) of the two mirrors. A source (44) of light disposed on the axis between the two mirrors illuminates the auxiliary optical elements to develop a set of eight beams, in a preferred embodiment of the invention, which are directed to the optical elements. There are two subsets of the beams, one set comprising four crisscrossing beams (C) which cross the central axis, and the second subset (D) traveling directly between the mirrors without crossing the central axis. The locations of reception of the beams relative to the detectors is sensed to ascertain the presence of any failure of alignment, thereby to permit correction of alignment with respect to tilt, decentering, despace, as well as a bowing of the primary mirror. The optical elements may be fabricated as holographic optical elements.

20 Claims, 7 Drawing Sheets

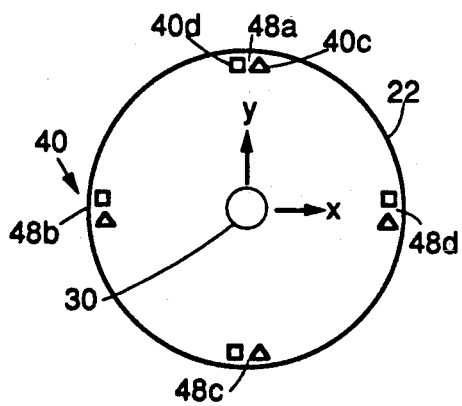
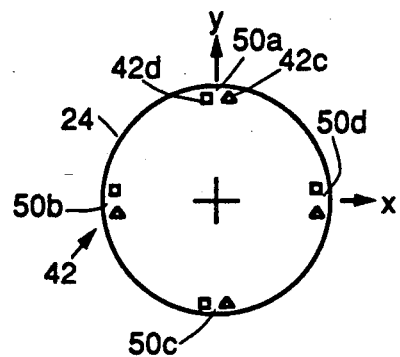
FIG. 5.  FIG. 6.
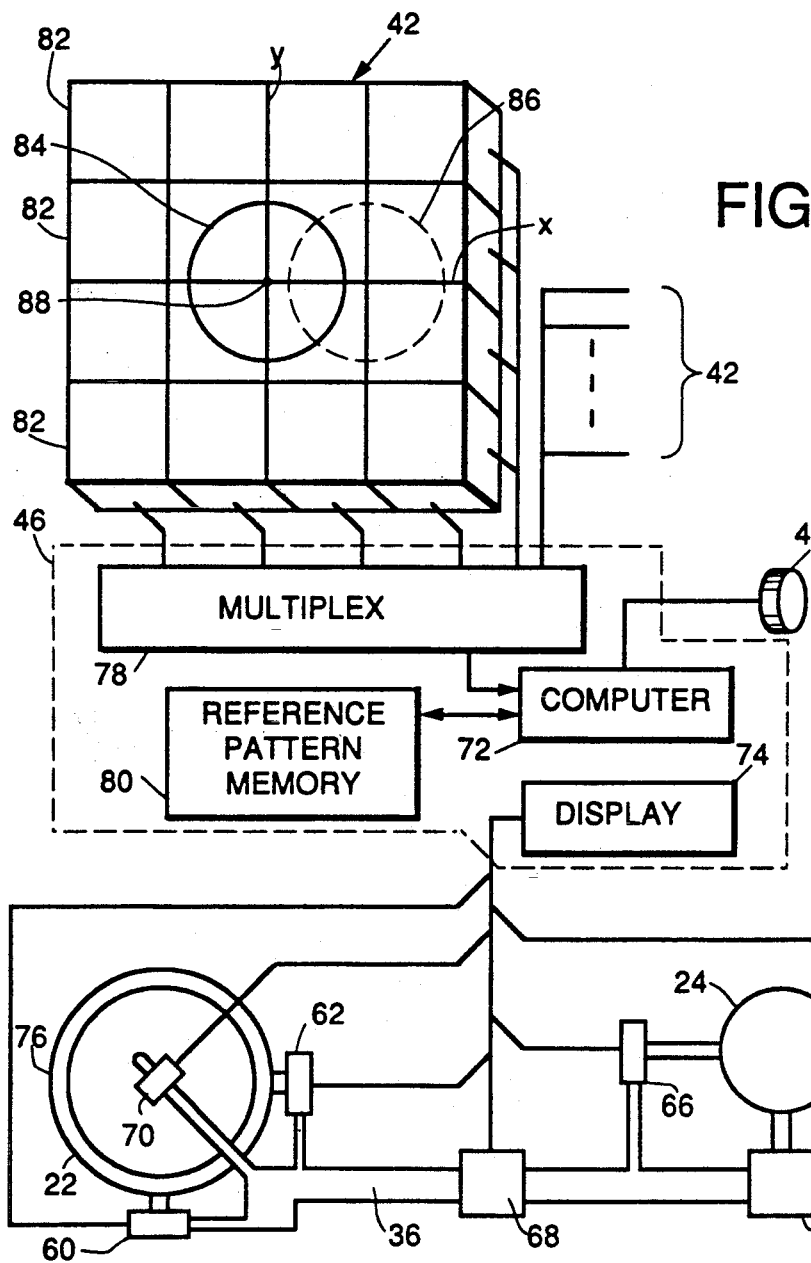
FIG. 7.

OPTICAL ALIGNMENT BY USE OF ARRAYS OF REFLECTIVE OR DIFFRACTIVE OPTICAL ELEMENTS AND DETECTORS

This invention was made with Government support under Contract No. N60921-86-C-0017 awarded by the U.S. Navy. The Government has certain rights in this invention.

BACKGROUND OF THE INVENTION

This invention relates to alignment of two elements of an apparatus, such as the primary and the secondary mirrors of a telescope and, more particularly, to the use of an array of detectors positioned about the secondary mirror, in conjunction with a corresponding array of reflective or diffractive optical elements positioned about the primary mirror, for redirecting light of a central source to the detectors by means of direct beams and crisscrossing beams to develop a measure of alignment including data as to deformation of the primary mirror.

In the construction of mechanical structures, it may be necessary to provide precise alignment of a first element of a structure to a second element of the structure. Accurate alignment can be accomplished best by use of optical apparatus. An important example of such a mechanical structure is a telescope wherein the first element corresponds to a primary mirror and the second element corresponds to a secondary mirror. In the usual construction of such telescopes, the two mirrors are positioned coaxially in spaced-apart relation, with a reflecting surface of the secondary mirror facing a reflective front side of the primary mirror.

In terms of an XYZ orthogonal coordinate system, wherein the Z axis coincides with the optical axis of the foregoing telescope, and the X and the Y coordinates are transverse to the Z axis, alignment concerns an offset between mechanical elements or mirrors in either the X direction or the Y direction, this being known as decentering. The alignment also concerns a displacement along the Z axis, known as despace, which alters a desired spacing between the two mechanical elements or mirrors. The alignment furthermore concerns rotation of the first mechanical element, or primary mirror, about either the X or the Y axis. In addition, particularly in the case of optical systems such as the foregoing telescope, there is concern as to any deformation or bowing of the primary mirror, particularly in the case of large mirrors of astronomical telescopes. Therefore, the alignment is concerned also with the detection of any bowing of the primary mirror, since the effects of this deformation on the performance of most in-situ alignment systems is significant.

A problem arises in that presently available optical systems for measurement of alignment present excessive difficulty in use and, furthermore, as in the case with a laser gauge system, require a succession of steps which, if interrupted, necessitates a restart of the calibration procedure.

SUMMARY OF THE INVENTION

The aforementioned problem is overcome and other advantages are provided by an optical alignment system and method for aligning two elements of a mechanical apparatus with each other. In the alignment system, bowing or deformation causes a unique signal that is easily recognized and separated out from a received signal, and can be use for correction. While the optical alignment of the invention is generally applicable to mechanical structures, it is particularly useful for aligning mechanical elements of an optical structure such as an alignment of a primary mirror with a secondary mirror in an astronomical telescope. The system of the invention is useful both in telescopes carried in a spaceship or satellite encircling the earth, as well as for a stationary telescope mounted on the earth.

The methodology and system of the invention is explained most readily by reference to the foregoing telescope, it being understood that the description of the invention applies equally well to other mechanical apparatus. The invention employs a set of auxiliary optical elements (reflective or diffractive) disposed about a peripheral portion of the primary mirror and arranged symmetrically about the central axis of the telescope. A corresponding array of light detectors, having the same arrangement as the array of the light auxiliary optical-elements, is positioned about a peripheral portion of the secondary mirror and arranged symmetrically about the axis of the telescope. The primary mirror and the secondary mirror are normal to the axis and are centered on the axis. The detectors face the auxiliary optical elements, the array of auxiliary optical-elements being aligned with the array of detectors such-that there is a one-to-one correspondence between the auxiliary optical elements and the detectors. A source of light is positioned on the axis, preferably between the two mirrors and close to the secondary mirror, for illuminating the auxiliary optical elements. The auxiliary optical elements direct beams of light of the source towards specific ones of the detectors in accordance with a specific plan which enables practice of the invention. It is to be noted that the term "light" as used herein includes visible light as well as other portions of the electromagnetic spectrum such as infrared and ultraviolet radiation.

In accordance with a feature of the invention, the detectors are located in a sufficient number of locations in the detector array to define a plane. Thus, there is a minimum of three detector locations positioned symmetrically about the axis of the secondary mirror. However, in a preferred embodiment of the invention, there are four detector locations positioned 90 degrees apart about the periphery of the secondary mirror. Two detectors are positioned at each detector location for a total of eight detectors. A corresponding four locations for auxiliary optical elements are disposed on the primary mirror with two auxiliary optical elements at each location for a total of eight auxiliary optical elements. The array of eight auxiliary optical elements are divided into two subarrays, each having four auxiliary optical elements. In a first of the two subarrays, beams of light reflected or diffracted by the auxiliary optical elements cross the central axis to be received by four of the eight detectors. The second of the subarrays of auxiliary optical elements directs beams of light in planes parallel to the central axis without crossing the central axis, so as to be received by the remaining four of the eight detectors. Thus, the set of four detectors which are in locations corresponding to the locations of the auxiliary optical elements receive light directly from the second subarray of auxiliary optical elements while the detectors located diametrically opposite the foregoing four detectors receive the set of crisscrossing beams of the first subarray of auxiliary optical elements.

The first subarray of auxiliary optical elements with its crisscrossing beams suffices to provide data as to tilt, decentering, and despace aspects of the alignment. However, both of the subarrays of the auxiliary optical elements must cooperate to provide data as to distortion, particularly bowing, of the primary mirror. Any aspect of misalignment introduces a change in the locations of the light beams at the points of intersection with the array of detectors. Each detector comprises a plurality of photodetector elements arranged in a two-dimensional array for sensing the position of impingement of the centroid of a focussed beam upon the detector. A computer connected to all of the detectors analyzes the resulting pattern of locations of received beams to determine the condition of alignment so as identify a possible faulty condition of tilting, decentering or despacing, as well as bowing, and to provide data for correction of the faulty condition so as to attain the desired accuracy of alignment. A set of servo-controlled actuators may be provided for automatically correcting the alignment in response to command signals outputted by the computer to the actuators. In a preferred embodiment of the invention, each of the auxiliary optical elements is constructed in the form of holographic optical element, wherein each such element comprises a fragmentary portion of a reflective zone plate oriented to direct its beam in a specific direction.

BRIEF DESCRIPTION OF THE DRAWING

The aforementioned aspects and other features of the invention are explained in the following description, taken in connection with the accompanying drawing wherein:

FIGS. 5 and 6 show, respectively, auxiliary optical elements and detectors disposed symmetrically about a central axis of FIG. 1, wherein auxiliary optical elements and detectors of direct rays of radiation of FIG. 4 are portrayed in FIGS. 5 and 6 as rectangles, and auxiliary optical elements and detectors of crisscrossing rays of FIG. 4 are portrayed in FIGS. 5 and 6 as triangles;

FIG. 7 is a diagrammatic view showing interconnection of a computer with detectors and several actuators to provide for correction of alignment of the mirrors of FIG. 1 in response to an analysis of patterns of optical signals received by the detectors;

DETAILED DESCRIPTION

Figure 1:
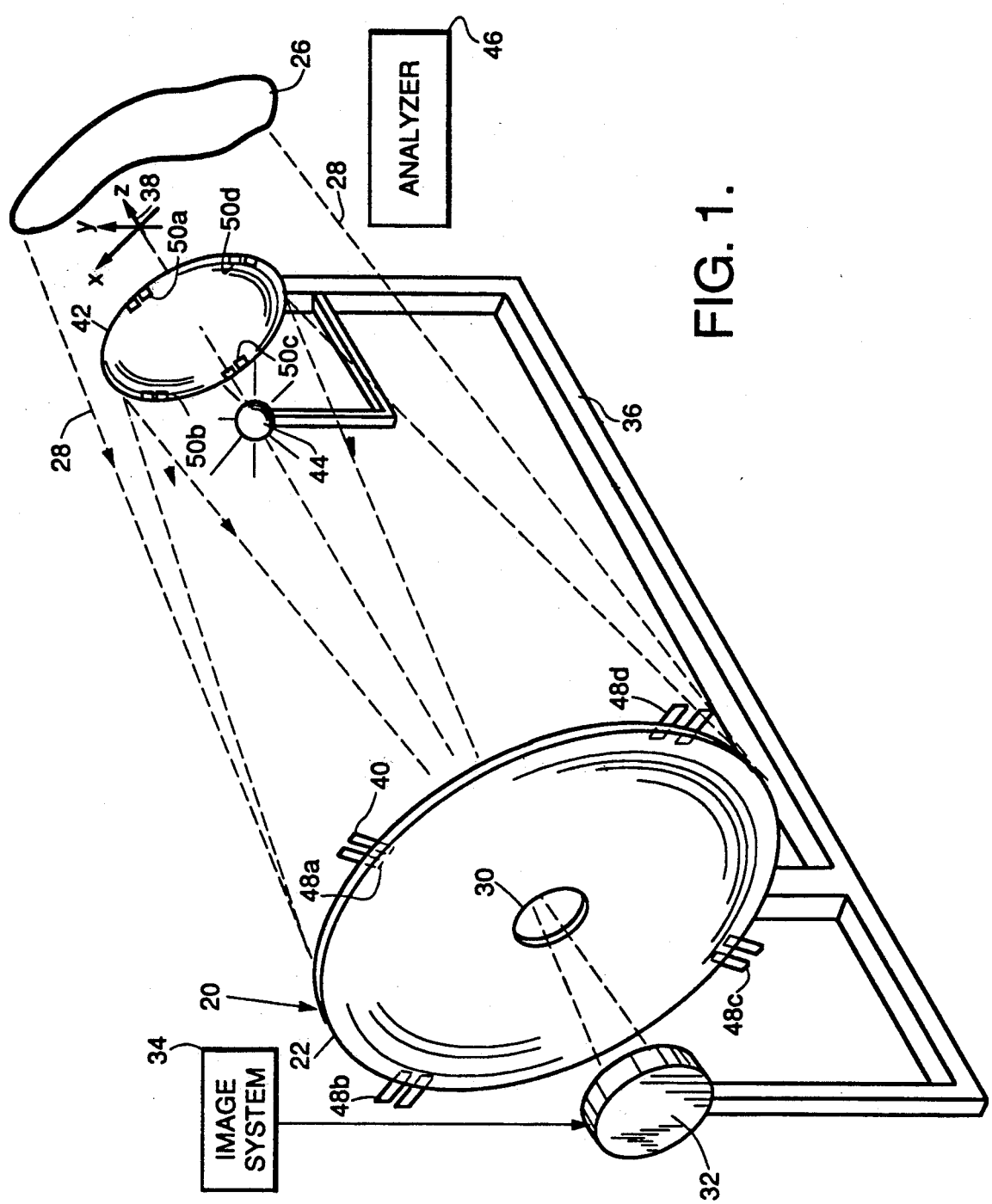
FIG. 1 shows a stylized view of an apparatus having two mechanical elements to be positioned relative to each other, the apparatus being portrayed as a telescope having primary and secondary mirrors supporting arrays of auxiliary optical elements and detectors for alignment of the mirrors in accordance with the invention.

FIG. 1 shows an apparatus suitable for the practice of the invention for aligning a first element with a second element of the apparatus by use of an optical system and methodology of the invention. By way of example in the practice of the invention, the apparatus shown in FIG. 1 is a telescope 20 comprising a primary mirror 22 and a secondary mirror 24 for viewing a distant subject 26. Rays 28 of radiation emanating from the subject 26 are captured by a concave reflecting surface of the primary mirror 22 and directed towards a convex reflecting surface of the secondary mirror 24. The rays are reflected then by the secondary mirror 24 through a central hole 30 in the primary mirror 22 to impinge upon a sensor 32 which senses the intensity of the radiation and outputs an electric signal to an imaging system 34. By way of example, the sensor 32 may comprise a two-dimensional array of radiation detector elements for obtaining image data of the subject 26, the imaging system 34 including means (not shown) for displaying an image of the subject 26. The primary mirror 22, the secondary mirror 24 and the sensor 32 are supported in their respective positions by a frame 36, indicated schematically, which rigidly holds the components of the telescope 20 in their desired locations to ensure accurate sighting of the subject 26.

The invention is employed to attain and to maintain accurate alignment between the primary mirror 22 and the secondary mirror 24. To simplify the description of the invention, it is presumed that the secondary mirror 24 is arranged coaxially with the primary mirror 22 along a common axis 38 which, in terms of an XYZ orthogonal coordinate system, is the Z axis. The X and the Y axes, as shown in FIG. 1, are directed normally to the Z axis, and establish a convenient frame of reference for describing the optical system of the invention for the aligning of the telescope 20. As will be described hereinafter, the inventive concept employs patterns of beams which are to be received upon proper alignment of the mirrors 22 and 24, wherein various forms of deviation from the pattern represent various aspects of misalignment. These beam patterns are visualized most readily in the case of symmetrical positioning of the mirrors 22 and 24 about the common axis 38; however, the principles of the invention apply equally well to a situation wherein the secondary mirror 24 may be offset intentionally from the axis 38, or inclined relative to the axis 38, in which case the beam patterns could be altered slightly but are informative as to the accuracy of alignment.

Figure 13:
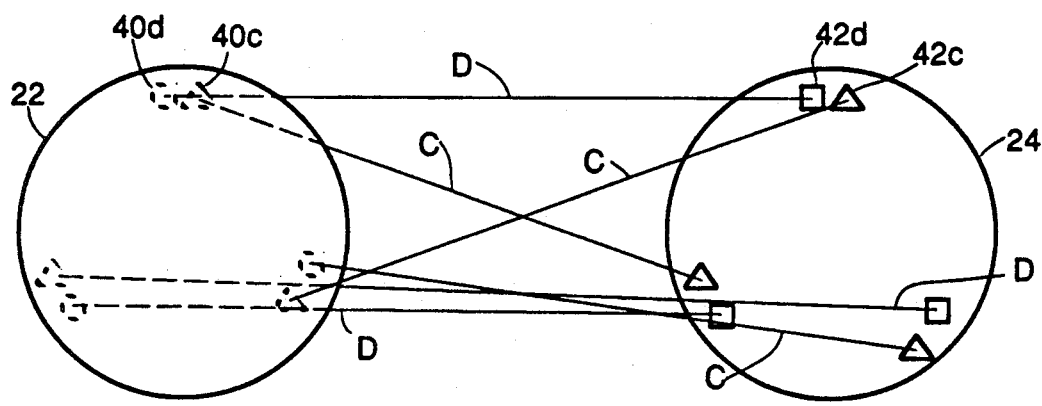
FIG. 13 demonstrates diagrammatically application of the theory of the invention to an array of auxiliary optical elements and detectors located at only three locations on the primary and the secondary mirrors, respectively, of FIG. 1.

The optical system of the invention comprises a set of auxiliary optical elements 40 disposed uniformly about a periphery of the primary mirror 22, a set of detectors 42 disposed uniformly about a periphery of the secondary mirror 24, a source 44 of monochromatic light positioned for illuminating the auxiliary optical elements 40, and a beam-pattern analyzer 46 coupled to the detectors 42. Each of the auxiliary optical elements 40 may be fabricated as some form of a reflector, such as a mirror or holographic optical element, by way of example. In a preferred embodiment of the invention, the auxiliary optical elements 40 comprise holographic optical elements, and are positioned at four locations 48A-D at intersections of an XZ plane and a YZ plane with the primary mirror 22. The detectors 42 are located similarly at four locations 50A-D at intersections of the XZ plane and the YZ plane with the secondary mirror 24. Furthermore, there are two auxiliary optical elements 40 located at each of the locations 48A-D for reasons which will become apparent in the ensuing description. Similarly, there are two corresponding detectors 42 located at each of the locations 50A-D or, alternatively, the two detectors may be replaced with a single detector (not shown) capable of sensing two focussed beams simultaneously. The use of the four locations 48A-D on the primary mirror 22 and the four locations 50A-D on the secondary mirror 24 provides for beam patterns which are readily identifiable for indicating the position of alignment between the primary and the secondary mirrors 22 and 24. However, if desired, additional auxiliary optical elements and additional detectors (not shown) may be installed at additional locations on the mirrors 22 and 24, respectively, with additional reference patterns, in accordance with the invention, being established so as to interpret the additional beam positions. Also, in accordance with the invention, it is possible to attain alignment data by the positioning of auxiliary optical elements and detectors at only three locations on the primary and the secondary mirrors 22 and 24, respectively, as will be described with reference to FIG. 13. However, the configuration of the optical arrangement of FIG. 13 is not as convenient to use as that of the preferred embodiment of the invention because of a need for resolving coordinates of its data to attain the X and the Y components of the alignment parameters.

In the operation of the optical alignment system of FIG. 1, the light source 44 is energized to provide a diverging beam of light which illuminates all of the auxiliary optical elements 40. Rays of light from the source 44 impinging upon the auxiliary optical elements 40 are directed back towards specific ones of the detectors 42 in the form of individual beams of light impinging upon respective ones of the detectors 42. Each of the detectors 42 has a photo-reception area substantially larger than a beam diameter so as to enable detection of any offset of the beam center from the center of a detector. As will be described in further detail with reference to FIG. 7, each detector 42 is formed as a mosaic or array of photodetector elements individually coupled to the analyzer 46, thereby allowing the analyzer 46 to determine beam position versus detector center for each of the detectors 42. Each of the auxiliary optical elements 40 is oriented so as to direct its beam towards the center of the designated detector 42. Thus, correct alignment is indicated by a centering of all of the beams upon the respective detectors 42. A deviation of a beam from the center of a detector 42 is indicative of an inaccuracy in an aspect of the alignment, the particular aspect such as tilt, decentering, despacing, or a bowing of the primary mirror 22, being indicated by patterns of deflection of the beams from their desired location, in a manner to be described hereinafter.

Figure 2:
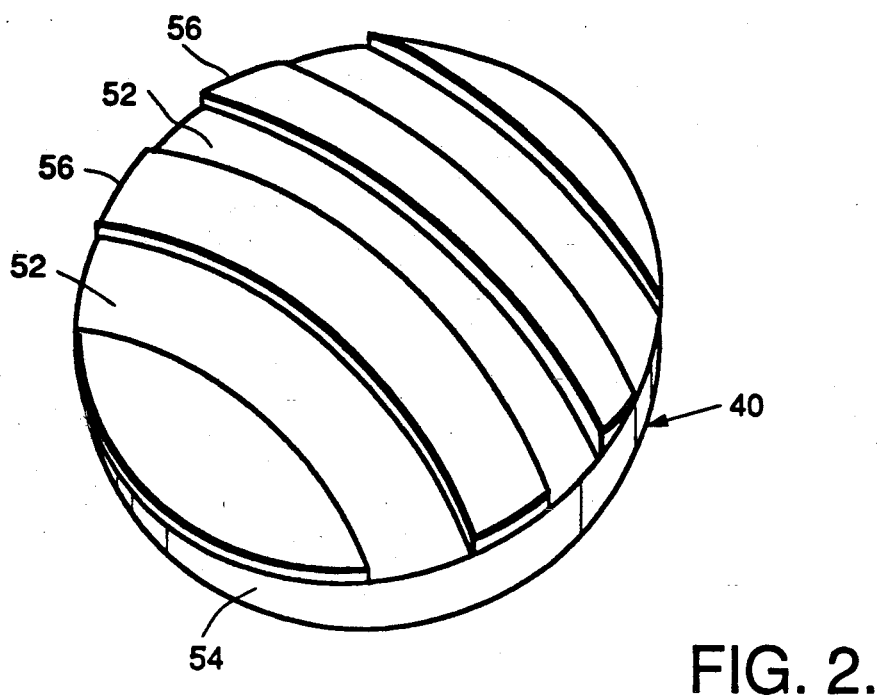
FIG. 2 is a perspective view of an auxiliary optical-element constructed as a holographic optical element, particularly as a fragment of a reflective zone plate.
Figure 3:
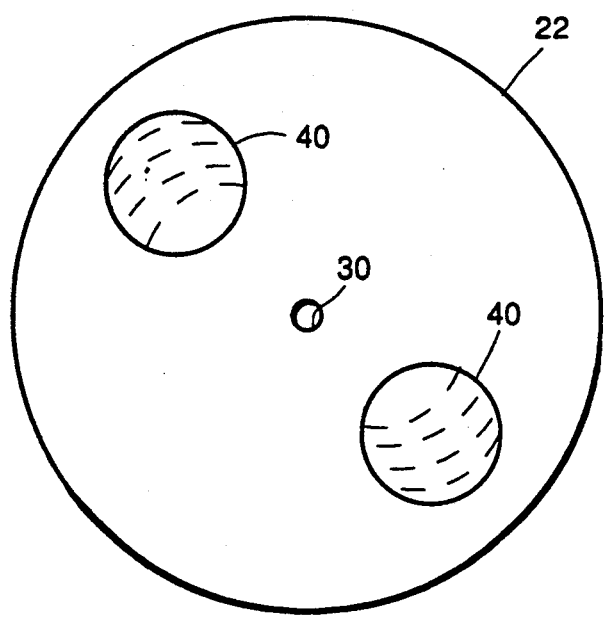
FIG. 3 shows an arrangement of two optical elements of a set of auxiliary optical elements, the optical elements of FIG. 3 having the construction shown in FIG. 2.
Figure 4:
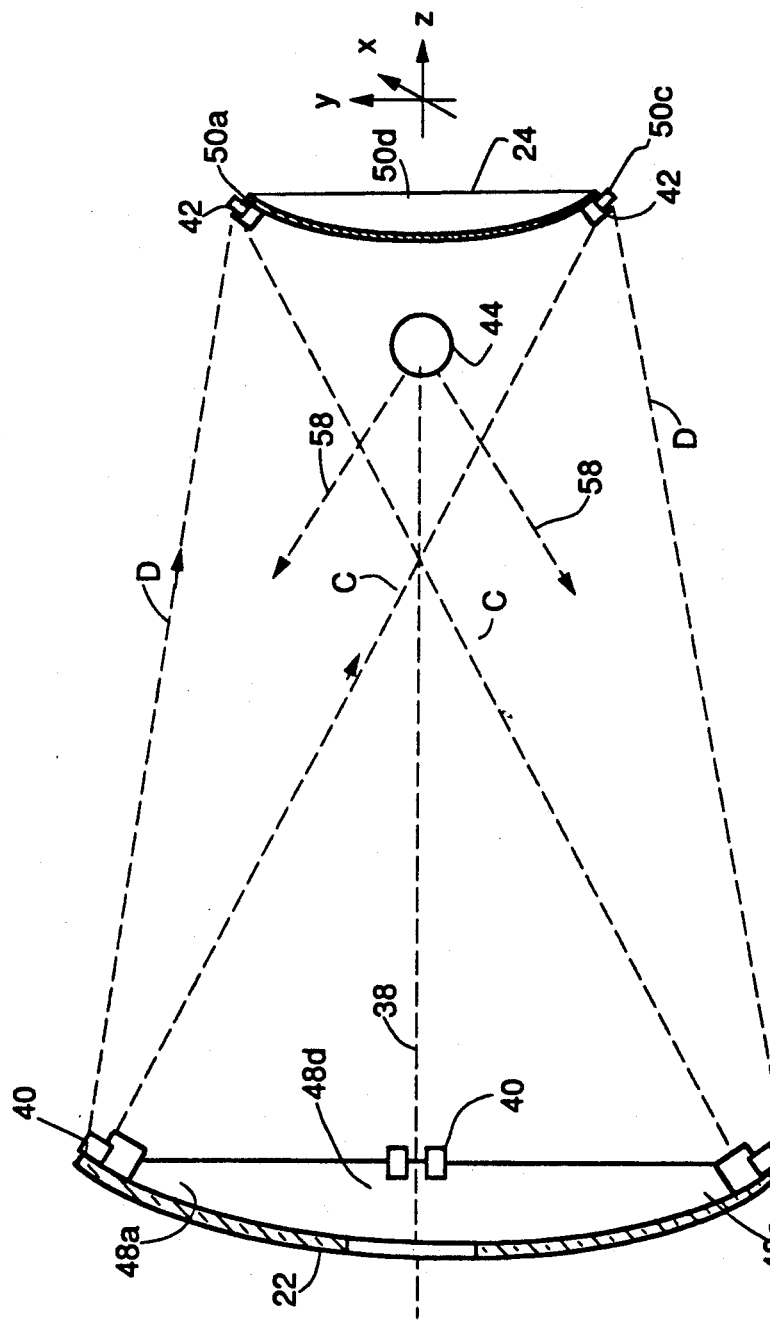
FIG. 4 is a diagrammatic view of rays of light propagating between auxiliary optical elements and detectors disposed on primary and secondary mirrors, respectively, in FIG. 1, the mirrors in FIG. 4 being shown in section.

FIGS. 2 and 3 give details in the construction and positioning of an auxiliary optical element 40 in accordance with a preferred embodiment of the invention wherein each auxiliary optical-element is constructed as a holographic optical element. While it is possible, in the practice of the invention, to employ mirrors having slightly concave reflecting surfaces for directing light from the source 44 to a detector 42 (FIG. 1), the use of the holographic optical element is preferred because of greater ease in initial alignment of each element. The holographic optical element comprises a fragmentary portion of a reflective zone plate wherein the complete zone plate (not shown) would be concentric to an axis which is parallel with the optical axis of the primary mirror 22 and passing through the desired detector 42 (FIG. 4). Such a zone plate would convert diverging rays of light from the source 44, to be located at the focus of the zone plate, into a collimated beam of radiation directed parallel to the axis 38. Any fragmentary portion of the zone plate would transmit only a small portion of the rays of the collimated beam, which small portion would, in itself, be a collimated beam of relatively narrow diameter. Thereby, each auxiliary optical element 40, configured as a holographic optical element, develops a narrow collimated beam in concept. In actuality, each collimated beam is focussed by the primary mirror 22 onto a detector 42. By tilting each auxiliary optical element 40 individually, the beam emanating from each individual auxiliary optical element 40 can be directed to a specific one of the detectors 42. Thereby, each detector 42 receives a well defined beam.

As shown in FIG. 2, the zone-plate construction of the auxiliary optical element 40 is attained by the provision of flat arcuate channels 52 formed within a base 54 and separated by ridges 56. As shown in FIG. 3, the auxiliary optical elements 40 are oriented such that the channels 52 of larger radii of curvature are located at a greater distance from the center of the primary mirror 22, and the ridges 56 and channels 52 of smaller radii of curvature are located closer to the center of the primary mirror 22. Also, as is well known in the construction of zone plates, the width of the ridges 56 and of the channels 52 decreases with increasing distance from the center of the primary mirror 22. The relationship between wavelength of radiation and the radii of the various channels 52 and ridges 56 of a zone plate is well known, and need not be described herein in further detail for the generation of the desired beams of light.

As shown in FIGS. 1, 4, 5 and 6, there are two auxiliary optical elements 40 disposed at each of the locations 48A-D upon the primary mirror 22. At each detector location, such as the location 48A, the two auxiliary optical elements 40 generate beams which illuminate detectors 42 lying within the same YZ plane as the auxiliary optical elements 40 at the location 48A. One of the beams D (FIG. 4) follows a direct path without a crossing of the axis 38 while the other beam C follows a path which crosses the axis 38. As shown in FIG. 4, the path of the beam D would intercept the axis 38 if continued beyond the secondary mirror 24. However, in the practice of the invention, generally, the two mechanical elements, represented by the primary mirror 22 and the secondary mirror 24, need not be of different sizes, or the detectors 42 may be mounted outboard (not shown) on a structure supporting the secondary mirror 24, in which case the beam D might be parallel to the axis 38. To facilitate a showing of which auxiliary optical element 40 provides a direct beam D, and which auxiliary optical element 40 provides a crossing beam C, FIG. 5 provides further identification of the auxiliary optical elements 40 by auxiliary optical elements 40D which provide direct beams D and auxiliary optical elements 40C which provide crossing beams C. Furthermore, in FIG. 5, the auxiliary optical elements 40D are identified diagrammatically by squares, and the auxiliary optical elements 40C are identified diagrammatically by triangles. Similarly, in FIG. 6, detectors 42 which receive the direct beams D are identified as detectors 42D and are portrayed diagrammatically as squares, and detectors 42C which receive crossing beams are identified diagrammatically by triangles.

Thereby, a diverging cone of light rays 58 from the source 24 illuminates the auxiliary optical elements 40, as shown in FIG. 4, to provide a set of direct beams D and a set of crossing beams C. With respect to the crossing beams C, it is noted that these beams cross the axis 38 in the preferred embodiment of the invention because of the symmetry in location of the auxiliary optical elements 40 and detectors 42 such that, by way of example, the locations 48A and 48C of auxiliary optical elements are diametrically opposite each other, and the detector locations 50A and 50C are diametrically opposite each other. However, with some other geometrical arrangement of the auxiliary optical elements and the detectors, such as the triangular arrangement of FIG. 13, the direct rays D still propagate from an auxiliary optical-element 40 to a corresponding detector 42 disposed in a common plane with the axis 38. However, the crossing beams C, while still crossing over to the opposite side of the secondary mirror 24, cross via paths which bypass the axis 38.

The set of auxiliary optical elements 40B may be regarded as a subarray producing the direct beams, and the auxiliary optical elements 40C may be regarded as a subarray producing the crossing beams. In corresponding fashion, the detectors 42D may be regarded as a subarray of detectors for detecting the direct beams, and the detectors 42C may be regarded as a subarray of detectors for detecting the crossing beams. Only the crossing beams C and their corresponding arrays of auxiliary optical elements 40C and detectors 42C are required for identifying the alignment aspects of tilt, decentering, and despacing. However, both sets of direct beams D and crossing beams C in conjunction with both subarrays of auxiliary optical elements 40D and 40C and both subarrays of detectors 42D and 42C are required for identifying the alignment aspect of the bowing or deformation of the primary mirror 22.

FIG. 7 shows interconnection of the detectors 42 with the analyzer 46, and also shows, diagrammatically, a set of actuators 60 62, 64, 66, 68, and 70 interconnecting the frame 36 with the mirrors 22 and 24. The actuators 60-70 allow for automatic adjustment of the alignment between the mirrors 22 and 24 in response to signals outputted by a computer 72 of the analyzer 46. Alternatively, if desired, the actuators 60-70 may be replaced with manually adjustable connections (not shown) between the frame 36 and the mirrors 22 and 24 to allow for an alignment of the mirrors 22 and 24 in response to alignment data provided by the computer 72 on a display 74.

The actuator 60 introduces a displacement of the primary mirror 22 along the Y axis relative to the frame 36, and also introduces a rotation of the primary mirror 22 about the Y axis. The actuator 62 introduces a displacement of the primary mirror 22 along the X axis relative to the frame 36, and also introduces a rotation of the primary mirror 22 about the X axis. The actuator 64 introduces a displacement of the secondary mirror 24 along the Y axis relative to the frame 36, and also introduces a rotation of the secondary mirror 24 about the Y axis. The actuator 66 introduces a displacement of the secondary mirror 24 along the X axis relative to the frame 36, and also introduces a rotation of the secondary mirror 24 about the X axis. The actuator 68 is disposed directly within the frame 36 to provide for an elongation or contraction of the frame 36, thereby to adjust the spacing between the mirrors 22 and 24 along the Z axis. The actuator 70 connects with a portion of the frame 36 which supports a midsection of the primary mirror 22. Connection of the actuators 60 and 62 to the primary mirror 22 is made by way of a circumferential supporting rim 76 which encircles the perimeter of the primary mirror 22 for supporting the primary mirror 22. Operation of the actuator 70 urges the midsection of the mirror 22 towards or away from the rim 76 to alter curvature of the mirror 22, thereby to correct bowing or other deformation. While only one actuator 70 is shown in FIG. 7 for correction of bowing and deformation of the primary mirror 22, it is to be understood that, in general, the actuator 70 may be constructed as a set of actuators (not shown) distributed about a back side of the primary mirror 22 to provide for correction of any bowing or deformation as may be required.

Also included within the analyzer 46 is a multiplexer 78, and a memory 80 for storing reference patterns of the locations of the direct beams D and the crossing beams C (FIG. 4) upon the set of detectors 42 on the secondary mirror 24. Each of the detectors 42 is fabricated of a two-dimensional array of photodetector elements 82 arranged in rows and columns parallel to the X and the Y axes. Upon proper alignment of the mirrors 22 and 24, a beam impinges upon the center of the array of photodetector elements 82 as is indicated by a solid circle 84. In the event of a misalignment, such as a decentering along the X axis, the beam location is offset upon the array of photodetector elements 82 as shown by the dashed circle 86.

Each of the photodetector elements 82 outputs an electric signal to the multiplexer 78 in response to the intensity of light of the source 44 impinging upon the photodetector element 82. Thus, the magnitudes of the various photodetector signals and the locations of the various photodetector elements 82 which are outputting the signals provides information as to the location of the point of impingement of the centroid of a beam upon a detector 42. The sets of photodetector signals outputted by the various detectors 42 are applied via the multiplexer 78 to the computer 72 for extraction, in a well known fashion, of information as to the location of each of the beams upon each of the corresponding detectors 42. The reference patterns of beam locations upon the set of detectors 42, stored in the memory 80, enable the computer 72 to compare information inputted via the multiplexer 78 with the reference patterns stored in the memory 80. Examples of these patterns will be described hereinafter with reference to FIGS. 8-12. The center of the detector 42 is indicated at 88. Also shown in FIG. 7 is a connection of the light source 44 to the computer 72. The computer 72 activates the light source 44 during operation of an alignment procedure, and deactivates the light source 44 during normal use of the telescope 20, such as during the sighting of stars or other distant objects. With proper shielding, the light source 44 may be left on at all times, enabling constant correction of alignment disturbances.

Figure 8:
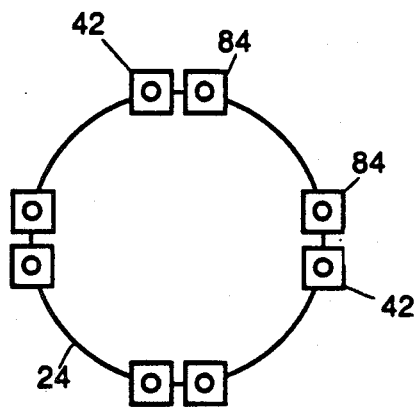
FIG. 8 shows a pattern of beams received by an array of detectors disposed on the secondary mirror of FIG. 1 in the case of correct alignment.
Figure 9:
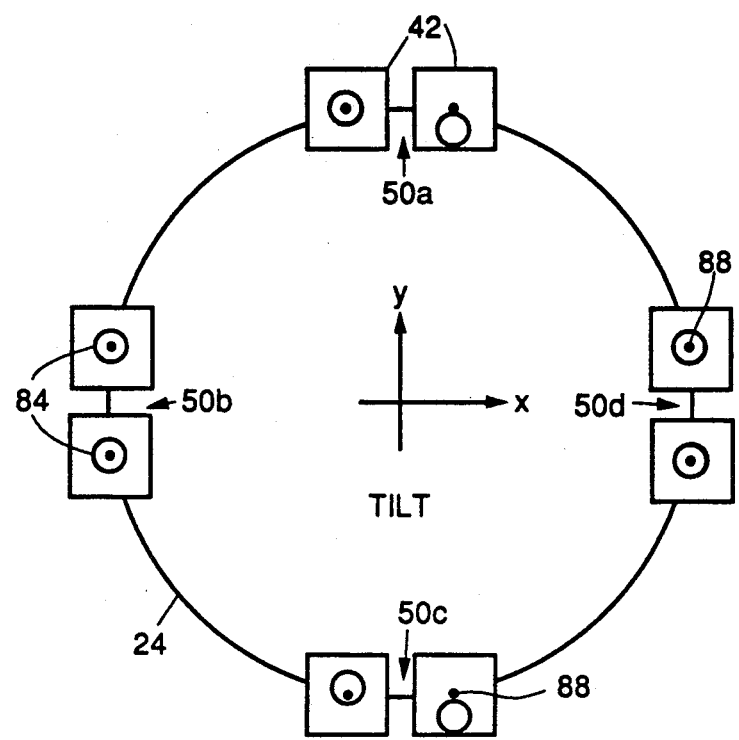
FIG. 9 shows the arrangement of FIG. 8 for the situation wherein the alignment is perturbed by a tilting of one mirror relative to the other mirror of FIG. 1, the tilting occurring by rotation of the secondary mirror about the X axis.

FIGS. 8-12 show various patterns of points of impingement of the beam of light, represented by a solid circle 84 upon each of the detectors 42 relative to a center 88 of each detector 42. In FIG. 8, the mirrors 22 and 24 are properly aligned and, accordingly, the circles 84 representing the light beams are centered within their respective detector 42 about the secondary mirror 24. FIG. 9 demonstrates a beam pattern resulting from an error of alignment due to a tilting of the secondary mirror 24 produced by a rotation of the mirror 24 about an axis parallel to the X axis of FIG. 4. In the example of FIG. 9, the top of the secondary mirror 24, location 50A as shown in FIG. 4, moves towards the primary mirror 22 while the bottom of the secondary mirror 24, as represented by the location 50C in the view of FIG. 4, moves away from the primary mirror 22. With reference to both FIGS. 6 and 9, it is appreciated that the direct beam D impinges upon the detector 42D at the location 50A, (the top of the detector array in FIG. 9), at a position which is offset from the center 88. As shown in FIG. 9, the circle 84 has been displaced slightly in the positive Y direction from the center 88. With respect to the crossing beam C, at the location 50A, the circle 84 representing the beam location is moved below the center 88. At the bottom of the array, as viewed in FIG. 9, at the location 50C, the direct beam D impinges at a location offset from the center 88 in the positive Y direction with the crossing beam C impinging with a greater displacement on its detector, the crossing beam C being displaced from the center 88 in the negative Y direction. In the detectors at the sides of the array, at locations 50B, and 50D, the beams are centered in their respective detectors 42.

Figure 10:
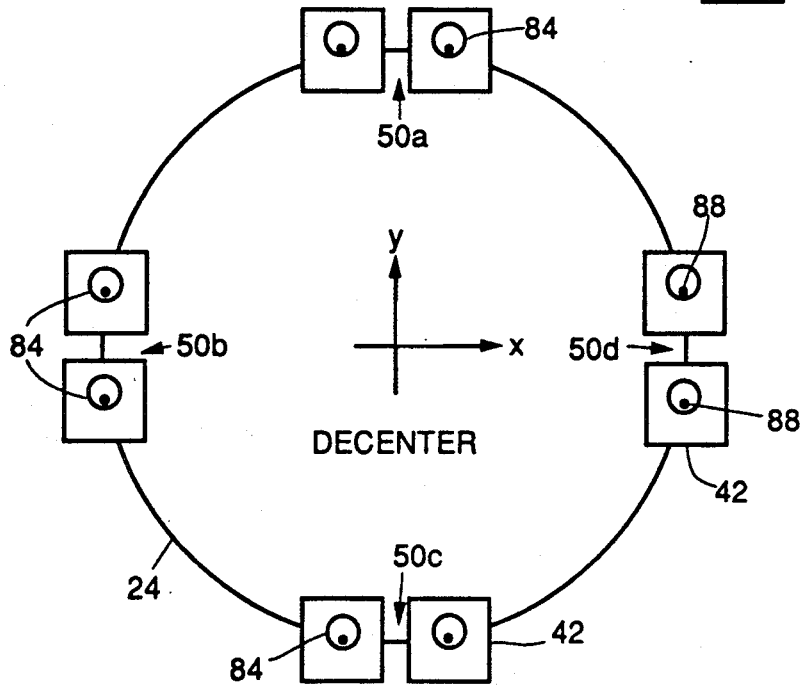
FIG. 10 shows the arrangement of FIG. 8 for the case wherein the alignment is perturbed by the decentering of one mirror relative to the other mirror, the decentering occurring by a shifting of the secondary mirror along the Y axis.

FIG. 10 demonstrates the beam pattern for an error in alignment due to a decentering of the secondary mirror 24 relative to the primary mirror 22. By way of example, FIG. 10 shows the beam pattern in the situation wherein the secondary mirror 24 has been displaced in the negative Y direction relative to the position of the primary mirror 22. As a result, all of the beams represented by the circles 84, for all of the detectors 42, are shown displaced in the positive Y direction relative to the centers 88 of the detectors 42.

Figure 11:
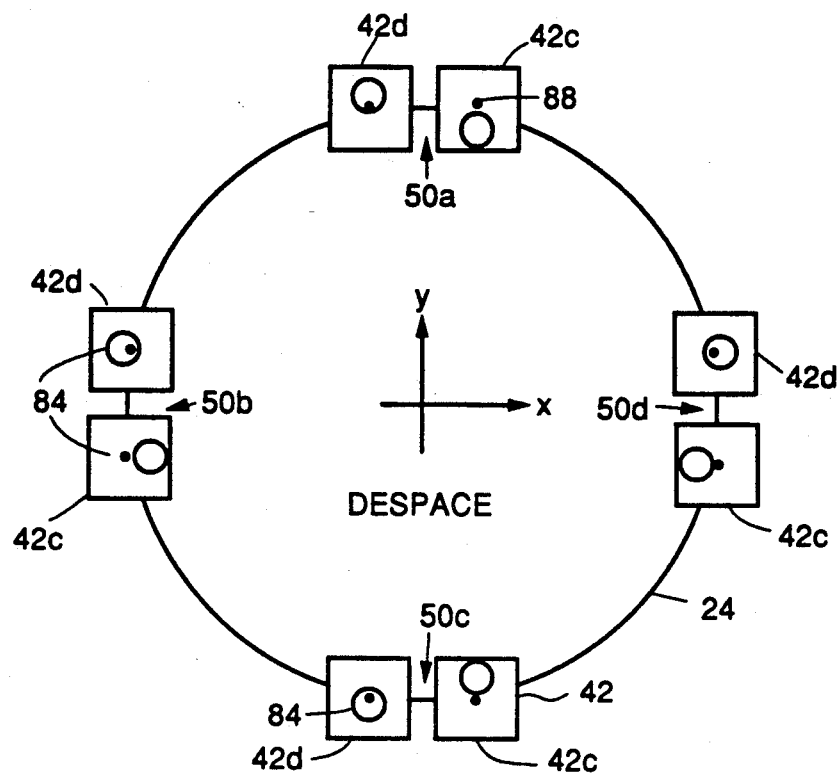
FIG. 11 shows the arrangement of FIG. 8 for the case wherein the alignment is perturbed by despace produced by a decrease in the spacing between the primary and the secondary mirrors.

FIG. 11 shows the pattern for an error in alignment resulting from despace. By way of example, FIG. 11 portrays the situation wherein the spacing between the primary and the secondary mirrors 22 and 24 has decreased from the desired spacing along the Z axis. Each of the direct beams D has moved radially outward from the desired beam pattern, as indicated by the circles 84 relative to the centers 88, and the positions of the crossing beams C at the detectors 42 have moved radially inward from the respective centers 88. The amount of displacement in the positions of the crossing beams C is greater than the amount of the displacement of he direct beams D due to the greater deangulation of the crossing beams C relative to the axis 38 (FIG. 4).

Figure 12:
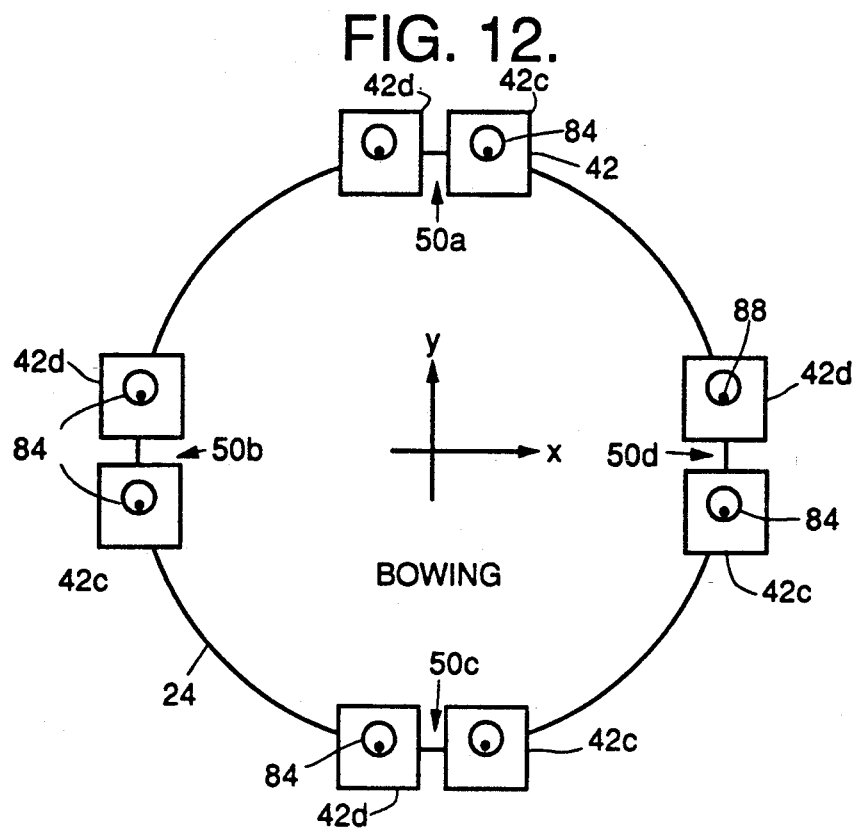
FIG. 12 shows the arrangement of FIG. 8 for the case wherein the alignment is perturbed by a bowing of the primary mirror.

FIG. 12 shows the effect of bowing on the beam pattern. By way of example, FIG. 12 shows the situation wherein the concavity of the primary mirror 22 has increased causing a deflection of all of the direct beams D towards the central axis 38, and an increased angulation of the crossing beams C relative to the central axis 38. This results in an inward radial displacement of the circles 84 for the direct beams D and an outward displacement of the circles 84 for the crossing beams C. Due to the increased angulation of the crossing beams C relative to the central axis 38, the displacement of the circles 84 of the crossing beams C is somewhat greater than that of the circles 84 of the direct beams D. Thus, as shown in FIG. 12, the circles 84 of the direct beams D have moved radially inward from the centers 88 of the respective detectors 42, while the circles 84 of the crossing beams C have moved radially outward from the centers 88 of the respective detectors 42, with beam displacement at the detectors 42C being greater than that at the detectors 42D. It is recognized that the pattern of displacement of the circles 84 is similar to that of the despace alignment error of FIG. 11; however, the differential displacement of the circles 84 between the direct and the crossing beams for the despace situation of FIG. 11 is greater than the differential displacement for the bowing situation of FIG. 12. Thereby, the two situations are distinguishable.

FIG. 13 shows application of the principles of the invention to an optical apparatus having a primary mirror 22 and a secondary mirror 24 wherein there are only three locations of auxiliary optical elements 40D and 40C on the mirror 22, and only three locations for detectors 42D and 42C on the mirror 24. In this case, there are only three direct beams propagating between the three auxiliary optical elements 40D and the three detectors 42D. Also, there are only three crossing beams propagating between the auxiliary optical elements 40C and the detectors 42C. With respect to the resultant beam patterns produced at the locations of the detectors 42C and 42D, it is noted that the resultant patterns are similar to the patterns of FIGS. 11 and 12 for the despace and the bowing, respectively. The patterns resulting from the configuration of FIG. 13 involve the same form of radial displacement of the beam centroids as disclosed in FIGS. 11 and 12 for despace and for bowing. However, in the cases of tilt and decenter of FIGS. 9 and 10, the displacement of the beam centroids is more complex, having components of both the X and the Y displacements which need be resolved, in the computer 72, by coordinate resolution. While the arrangement of FIG. 13 has fewer components, the accuracy is reduced from that of the preferred embodiment of FIG. 1 because of a reduced number of measurements. In FIG. 13, the crossing beams, as has been noted hereinabove, bypass the central axis 38 (shown in FIGS. 1 and 4), rather than following an intersecting path with the axis 38. If desired, additional auxiliary optical elements and detectors may be employed, such as in a pentagonal or hexagonal array (not shown) of locations about both of the mirrors 22 and 24.

In view of the forgoing description, the invention provides for an accurate alignment of two mechanical components by development of a set of optical beams, the invention being readily implemented by use of auxiliary optical elements such as holographic optical components on a first of the mechanical elements, and a set of light detectors on the second of the mechanical components. With respect to the positioning of the detectors on the second of a mechanical elements, such as the secondary mirror 24, the detectors may be placed within a peripheral region of the mirror 24 as shown in the figures or, alternatively, may be located near the mirror 24 on a supporting structure of the mirror 24. In the case of the positioning of the auxiliary optical elements on the first of the mechanical elements, such as the primary mirror 22, it is necessary to locate the auxiliary optical elements directly on the mirror 22 so as to enable a detection of bowing and deformation of the mirror 22; however, in the event that bowing data is not required, then the auxiliary optical elements may be located near the mirror 22 on a supporting structure thereof (not shown).

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for optically aligning an apparatus, the apparatus comprising a first member and a second member disposed transversely to an axis of said apparatus, said second member being located in front of said first member and spaced apart from said first member, said system comprising:
   a first array of optical elements disposed about said first member;
   a first array of detectors disposed about said second member facing said array of optical elements;
   a source of light for illuminating said array of optical elements;
   wherein an arrangement of detectors in said detector array is the same as an arrangement of optical elements in said optical-element array to provide correspondence in position between detectors of said detector array and optical elements of said optical-element array;
   each of said optical elements directs a beam of light of said source to a detector on a side of said detector array opposite the corresponding detector of said detector array;
   each of said detectors outputs a signal indicating the location of a light beam relative to the detector, the location of the light beam being dependent on alignment of said first member of said apparatus with said second member of said apparatus; and
   said system further comprises analyzing means responsive to signals outputted by the detectors of said detector array for measuring alignment between said first and said second members of said apparatus.

2. A system according to claim 1 wherein each of said detectors comprises an array of detector elements for detecting the location of a centroid of a light beam.

3. A system according to claim 1 wherein said detector array comprises at least three of said detectors, and said optical-element array comprises at least three of said optical elements.

4. A system according to claim 1 wherein each of said optical elements comprises a holographic optical element.

5. A system according to claim 1 wherein each of said optical elements comprises a portion of an optical reflective zone plate.

6. A system according to claim 1 wherein said apparatus is a telescope, said first member is a primary mirror of the telescope, said second member is a secondary mirror of the telescope, a diameter of said secondary mirror is smaller than a diameter of said primary mirror, and there are four detectors in said detector array and four optical elements in said optical-element array.

7. A system according to claim 1 wherein detectors of said detector array are disposed symmetrically about said axis, and optical elements of said optical-element array are disposed symmetrically about said axis.

8. A system according to claim 1 further comprising means responsive to alignment correction signals outputted by said analyzing means to adjust alignment between said first and said second members of said apparatus.

9. A system according to claim 1 further comprising:
   a second array of optical elements disposed about said first element of said apparatus;
   a second array of detectors disposed about said second member of said apparatus facing said second array of optical elements;
   wherein an arrangement of detectors in said second detector array is the same as an arrangement of optical elements in said second optical-element array to provide correspondence in position between detectors of said second detector array and optical elements of said second optical-element array;
   each of said optical elements of said second optical-element array directs a beam of light of said source to a corresponding detector of said second detector array;
   each light beam of an optical element of said second optical-element array propagates along one side of an optical axis of said apparatus, while each light beam of an optical element of said first optical-element array propagates along an optical path which crosses from a first side of said optical axis to a second side of said optical axis;
   each of said detectors of said second detector array outputs a signal indicating the location of a light beam relative to the detector, the location being dependent on alignment of said first member of said apparatus with said second member of said apparatus; and
   said analyzing means is responsive to signals outputted by the detectors of said second detector array for measuring the alignment between said first and said second members of said apparatus plus deformation of said first member.

10. A system according to claim 9 wherein said apparatus is a telescope, said first member is a primary mirror of the telescope, said second member is a secondary mirror of the telescope, a diameter of said secondary mirror is smaller than a diameter of said primary mirror, and there are four detectors in each of said detector arrays and four optical elements in each of said optical-element arrays; and
   each of said optical elements comprises a holographic optical element.

11. A system according to claim 10 wherein each of said detectors comprises an array of detector elements for detecting the location of a centroid of a light beam; and
   wherein detectors of both of said detector arrays are disposed symmetrically about said axis, and optical elements of both of said optical-element arrays are disposed symmetrically about said axis.

12. A method for optically aligning an apparatus, the apparatus comprising a first member and a second member disposed transversely to an axis of said apparatus, said second member being located in front of said first member and spaced apart from said first member, said method comprising steps of:
- disposing a first array of optical elements about said first element;
- disposing a first array of detectors about said second member facing said array of optical elements;
- illuminating said array of optical elements;
- aligning detectors in said detector array with optical elements of said optical-element array to provide correspondence in position between detectors of said detector array and optical elements of said optical-element array;
- directing a beam of light of said source from each of said optical elements to a detector on a side of said detector array opposite the corresponding detector of said detector array;
- outputting an output signal from each of said detectors indicating the location of a light beam relative to the detector, the location of the light beam being dependent on alignment of said first member of said apparatus with said second member of said apparatus; and
- analyzing signals outputted by the detectors of said detector array for measuring alignment between said first and said second members of said apparatus.

13. A method according to claim 12 further comprising a step of constructing each of said optical elements as a holographic optical element.

14. A method according to claim 12 further comprising a step of constructing each of said optical elements as a portion of an optical reflective zone plate.

15. A method according to claim 12 further comprising steps of:
- placing a second array of optical elements about said first member of said apparatus;
- placing a second array of detectors about said second member of said apparatus facing said second array of optical elements;
- aligning detectors of said second detector array with optical elements in, said second optical-element array to provide correspondence in position between detectors of said second detector array and optical elements of said second optical-element array;
- directing a beam of light of said source from each of said optical elements of said second optical-element array to a detector on one side of an optical axis of said apparatus;
- outputting an output signal from each of said detectors of said second detector array, the output signal indicating a location of a light beam relative to the detector, the location of the light beam being dependent on alignment of said first member of said apparatus with said second member of said apparatus; and
- analyzing signals outputted by the detectors of said second detector array for measuring alignment between said first and said second members of said apparatus and for measuring deformation of said first member.

16. A method according to claim 15 wherein said apparatus is a telescope, said first member is a primary mirror of the telescope, said second member is a secondary mirror of the telescope, a diameter of said secondary mirror is smaller than a diameter of said primary mirror, there are four detectors in said detector array, and there are four optical elements in said optical-element array, said method further comprising a step of
- constructing each of said optical elements as a holographic optical element.

17. A method according to claim 16 wherein each of said detectors comprises an array of detector elements for detecting the location of a centroid of a light beam, the method further comprising a step of;
- arranging detectors of said detector array and optical elements of said optical-element array symmetrically about said axis.

18. A system for optically aligning an apparatus, the apparatus comprising a first member and a second member disposed normally to an axis of said apparatus, said second member being located in front of said first member and spaced apart from said first member, said system comprising:
- a first optical-element array of holographic optical elements disposed about said axis and located on said first member;
- a first array of detectors disposed about said axis and located on said second member facing said optical-element array;
- a source of light for illuminating said optical-element array;
- wherein an arrangement of detectors in said detector array is the same as an arrangement of holographic optical elements in said optical-element array to provide correspondence in position between said detectors and said holographic optical elements;
- each of said holographic optical elements directs a beam of light of said source to a detector on a side of said array opposite the corresponding detector of said detector array;
- each of said detectors outputs a signal indicating the location of a light beam relative to the detector, the location of the light beam being dependent on alignment of said first member of said apparatus with said second member of said apparatus; and
- said system further comprises analyzing means responsive to signals outputted by the detectors of said detector array for measuring alignment between said first and said second members of said apparatus.

19. A system according to claim 18 wherein each of said holographic optical elements directs a beam of light of said source across said axis to a detector of said detector array;
- said source of light is located on a said axis in front of said first member; and
- said detectors and said holographic optical elements are arranged symmetrically about said axis.

20. A system according to claim 18 further comprising:
- a second optical-element array of holographic optical elements disposed about said first member of said apparatus;
- a second array of detectors disposed about said second member of said apparatus facing said second optical-element array;
- wherein an arrangement of detectors in said second detector array is the same as an arrangement of holographic optical elements in said second optical-element array to provide correspondence in position between detectors of said second detector array and holographic optical elements of said second optical-element array;

each of said holographic optical elements of said second optical-element array directs a beam of light of said source to a detector on one side of an optical axis of said apparatus;

each of said detectors of said second detector array outputs a signal indicating the location of a light beam relative to the detector, the location being dependent on alignment of said first member of said apparatus with said second member of said apparatus; and said analyzing means is responsive to signals outputted by the detectors of said second detector array for measuring the alignment between said first and said second members of said apparatus plus measurement of deformation of said first member.

* * * * *